United States Patent [19]
Ritter et al.

[11] Patent Number: 4,984,218
[45] Date of Patent: Jan. 8, 1991

[54] MARINE ACOUSTIC ARRAY CONFIGURED FOR TOW NOISE REDUCTION

[75] Inventors: Sammie F. Ritter, Flower Mound; Stephen A. Caldwell, Runaway Bay, both of Tex.

[73] Assignee: Mobil Oil Corporation, Fairfax, Va.

[21] Appl. No.: 514,902

[22] Filed: Apr. 26, 1990

[51] Int. Cl.$^5$ .......................... G01V 1/38; H04R 1/44
[52] U.S. Cl. .................................. 367/15; 367/106; 367/173; 114/244
[58] Field of Search ................. 367/15, 106, 130, 173; 181/110; 114/244

[56] References Cited

U.S. PATENT DOCUMENTS

| | | | |
|---|---|---|---|
| 2,434,358 | 1/1948 | Frank | 174/84 |
| 2,738,488 | 3/1956 | MacKnight | 367/177 |
| 2,766,501 | 10/1956 | Kellems | 24/123 |
| 3,893,065 | 7/1975 | Lea et al. | 340/8 MM |
| 3,939,464 | 2/1976 | Swenson | 340/4 R |
| 4,084,065 | 4/1978 | Swenson | 174/70 R |
| 4,160,229 | 7/1979 | McGough | 340/7 R |
| 4,295,212 | 10/1981 | Swenson | 367/20 |
| 4,357,689 | 11/1982 | Ruehle | 367/23 |
| 4,581,724 | 4/1986 | Zachariadis | 367/21 |

Primary Examiner—Nelson Moskowitz
Attorney, Agent, or Firm—Alexander J. McKillop; Charles J. Speciale; George W. Hager, Jr.

[57] ABSTRACT

A marine acoustic array employs a plurality of sections connected together sequentially with the outer surfaces of said sections having a non-smooth configuration to create a water flow along the length of the array as it is towed through a water layer that causes sensors within the array to provide outputs having improved signal-to-noise ratios.

4 Claims, 2 Drawing Sheets

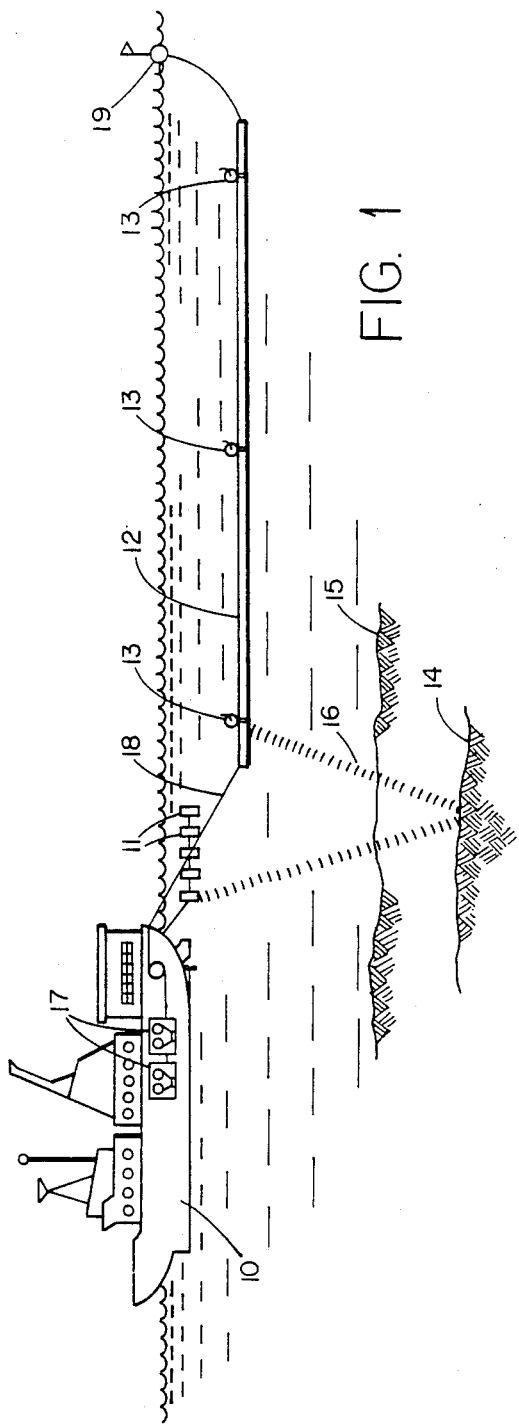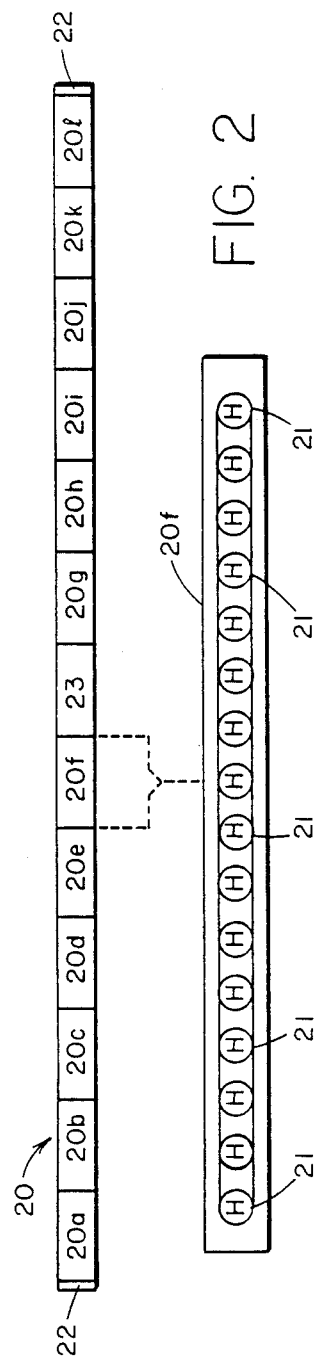

MARINE ACOUSTIC ARRAY CONFIGURED FOR TOW NOISE REDUCTION

BACKGROUND OF THE INVENTION

This invention relates to a marine acoustic survey and, more particularly to a marine acoustic array configured to alter turbulence conditions encountered by the array as it is towed along a line through a water layer so as to reduce tow noise effect on array contained hydrophones and other sensors.

In conducting a marine acoustic survey, an acoustic energy source is employed by an exploration vessel to generate an acoustic signal, referred to as a pressure wave, which is transmitted through the water layer into the subsurface formations. A portion of the signal is reflected from the subsurface reflecting interfaces back to the water layer where it is received by an acoustic array being towed behind the exploration vessel. The array is comprised of a plurality of acoustic sensors which generate electrical signals in response to the received acoustic signals. The acoustic signals are spread along the length of the array and are electrically connected through the array to recording instruments on board the exploration vessel. Such a marine acoustic survey may be typically carried out with the exploration systems of the type described in U.S. Pat. No. 4,357,698 to W. H. Ruehle and U.S. Pat. No. 4,581,724 to R. G. Zachariadis.

In such a marine acoustic survey numerous problems are encountered in the recording of marine data that are not encountered during a land survey. A primary one of these problems is water turbulence created by the movement of the array along a line through the water layer resulting in array tow noise. Reducing tow noise is of particular interest as it creates distortion in the received acoustic reflection signals.

It is, therefore, a primary object of the present invention to provide for a marine acoustic array that can alter such water turbulence during marine acoustic surveys so as to reduce array tow noise and thereby provide acoustic reflection signals with improved signal-to-noise ratios. Reducing noise will permit detection of deeper events and better resolution of events at all levels.

A further object is a reduction of tow noise in fixed and towed applications for locating and identifying marine vessels and marine life forms.

SUMMARY OF THE INVENTION

In accordance with the present invention there is provided a marine acoustic array with one or more linear sections having acoustic sensors for detecting acoustic reflection signals as the array is towed along a line through a water layer by a towing vessel. Each of the sections has a non-smooth outer surface so as to alter water flow along the length of the array as it is towed through the water layer to cause the signal-to-noise ratio output of said sensors to be improved over that produced by sensors within an array having smooth outer surfaces. The non-smooth outer surface alters the turbulence adjacent to the array, so as to spread the turbulent layer outward and reduce the intensity of the generated noise.

In one aspect, each array section comprises a flexible outer hose wall roughened along its outer surface.

In another aspect, each array section comprises a flexible outer hose wall having a coarse material affixed to its outer surface.

In a further aspect, each array section comprises a flexible outer hose wall having a plurality of pellets affixed to its outer surface.

In a yet further aspect, each array section comprises a flexible outer hose wall with its outer surface molded in a non-smooth configuration.

In yet another aspect, each array section comprises an outer hose wall made of a reticulated mesh.

In a still further aspect, each array section comprises a flexible outer hose wall surrounded by a jacket having a non-smooth configuration. Such a configuration may be a mesh-like configuration, as may be provided by netting for example. The jacket may also be of tubular configuration. In a yet further aspect adjacent sections of the array are surrounded by jackets of netting which impart opposite forces of rotation to the adjacent sections such that opposite forces of rotation alternate along the length of the array so as to prevent array rotation as the array is towed through the water layer. The netting may comprise two layers of strands spiraled in opposite directions. More particularly, the jacket surrounding a first section of each adjacent pair of sections employs an underlying layer of netting strands spiraled in a first direction and an overlying layer of netting strands spiraled in a second direction. The jacket surrounding a second section of each adjacent pair of sections employs an underlying layer of netting strands spiraled in the second direction and an overlying layer of netting strands spiraled in the first direction.

BRIEF DESCRIPTION OF THE DRAWINGS

FIG. 1 illustrates a marine acoustic survey system with which the marine acoustic array of the present invention may be utilized.

FIG. 2 illustrates the modular configuration of a typical marine acoustic array that may be utilized in accordance with the present invention.

DESCRIPTION OF THE PREFERRED EMBODIMENT

Figure 3:
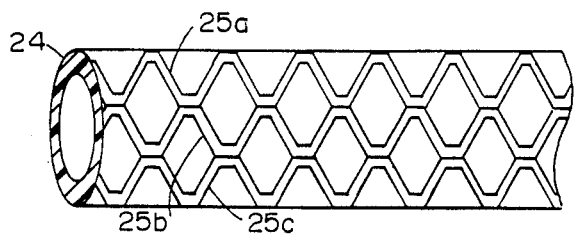
FIG. 3 illustrates a jacket of single-layer netting strands for surrounding a marine acoustic array.

Referring to FIG. 1, there will be described a marine acoustic survey system with which the marine acoustic array of the present invention may be employed. A marine vessel 10 traverses a line through a water layer. The vessel 10 tows one or more acoustic energy sources 11 and an acoustic array 12 employing a plurality of acoustic sensors (not shown) spaced along the length of the array. Acoustic energy is generated in the water by the source 11 and reflections 16 of such energy from subsurface formations 14 lying below the water bottom 15 are detected by the plurality of acoustic sensors along the array 12 as acoustic reflection signals. These acoustic signals are transferred to data recording and processing equipment 17 on the vessel 10 by way of electrical wiring through array 12 and up streamer tow cable 18. The array 12 may additionally be provided with one or more depth control devices 13 and a tail buoy 19. A typical acoustic energy source 11 used in marine acoustic surveys may comprise one or more air guns of the type described in U.S. Pat. No. 3,506,085 to G. B. Loper. A typical data recording and processing system 17 is the Texas Instruments Model DFS-V Digital Field Recorder.

Having described a typical marine acoustic survey system, there will now be described in more detail a typical marine acoustic array 12. Such a marine acoustic array typically includes a plurality of linear array sections connected together. Such array sections may include, among others, a lead-in section, a head stretch section, repeater module sections, electronic module sections, a tail section, and special sections as well as the acoustic sensor containing sections.

A typical array section 20 housing the acoustic sensors is illustrated in FIG. 2. Each such section 20 is identical so that it can be interchanged as necessary for repair or replacement. In a preferred embodiment, each array section 20 would be about 75 meters long and a typical marine acoustic array might comprise 50 such sections for a total length of approximately 3750 meters. Each array section 20 comprises a plurality of acoustic sensor containing modules 20a–201, each module being about 6.25 meters in length. Each module comprises a plurality of acoustic sensors, such as hydrophones 21 spaced along the length of the module such as shown in the enlargement of module 20f for example. Those hydrophones 21 in each module are connected in parallel to provide a single seismic signal output so as to increase signal strength and discriminate against directional noise, sixteen such hydrophones 21 being shown in module 20f for example. Also, a plurality of bulkheads (not shown) are positioned along the length of each module for supporting the cylindrical outer hose of the seismic streamer. Bulkhead connectors 22 as well as a program plug module 23 are shown in FIG. 2. The program plug module 23 is used in summing the hydrophones in adjacent modules for increasing hydrophone group lengths from 6.25 meters to 12.5 meters or 25.0 meters if desirable. FIG. 2 is merely a diagrammatic representation of an array section 20 and does not show conventional or state-of-the-art mechanical features of the array components such as the module connectors, the strain members, the electrical conductors, the hydrophones, or the bulkheads. These features are clearly disclosed in numerous U.S. patents, for example, U.S. Pat. Nos. 3,531,760 to Whitfill; 4,450,543 to Neeley; 4,736,345 to Keckler et al; 4,759,001 to Keckler et al; and 4,775,962 to Keckler et al.

The acoustic sensors along such a typical marine acoustic array are particularly sensitive to tow noise, especially tow noise created by water flow along the length of the array as it is towed through the water by a marine vessel during acoustic survey operations. It is, therefore, an object of the present invention to provide a marine acoustic array having a non-smooth outer surface configured to alter the water flow along the length of the array in order to cause the signal-to-noise ratio output of the acoustic sensors to be enhanced or improved over that ratio produced by acoustic sensors in an array having a smooth outer surface.

Others have attempted to minimize the effect of tow noise on acoustic sensors in marine acoustic arrays by providing thick jackets or sheaths around the array so as to move the turbulent boundary layer of water away from the outer surface of the flexible hose wall of the array. U.S. Pat. No. 3,893,065 to Lea et al describes a sheath of a commercially available foam surrounding a marine acoustic array. Such sheath is described as having a sufficiently large diameter (in the order of three times that of the flexible hose wall array). In both of these patents, the turbulent boundary layer of water is physically separated from the acoustic sensors within the array by a distance sufficient to reduce tow noise effect on the hydrophone output to an insignificant level. In similar manner, U.S. Pat. No. 4,160,229 to McGough describes a jacket of compliant material surrounding a marine acoustic array and spaced apart from the flexible outer hose wall array by spacers so as to reduce tow noise effect on the acoustic sensors within the array from the turbulent boundary layer of water. The teachings of both Lea et al and McGough are directed to the use of smooth outer surfaces for their described sheaths and jackets respectively. McGough particularly points out that tow noise resulting from the turbulent boundary layer of water around the array is minimized by employing a smooth streamlined outer configuration.

In contrast to these teachings of Lea et al and McGough, the present invention provides a marine acoustic array that is not smoothly configured along its outer surface for tow noise minimization and does not space the turbulent boundary layer of water further from the acoustic sensors to reduce the amplitude of tow noise detected by the acoustic sensors. The present invention is directed to a marine acoustic array having a non-smooth outer surface configuration designed to alter the water flow along the array in such a manner as to cause improved signal-to-noise ratio outputs from the acoustic sensors within the array.

Figure 4:
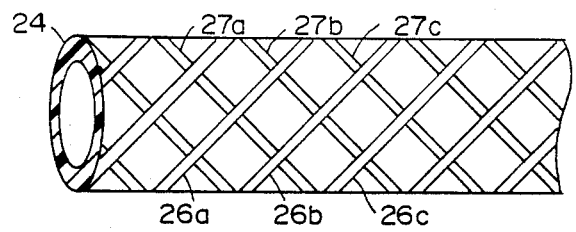
FIGS. 4–5 illustrate alternate mesh-like configurations of jackets having a double-layer netting strand for surrounding a marine acoustic array.

In carrying out the present invention, the marine acoustic array is configured with a non-smooth outer surface. Each of the array sections 20 employs a flexible outer hose wall, such as a plastic constructed from polyurethane for example. In one embodiment the flexible outer hose wall is surrounded with a jacket having a non-smooth configuration such as the mesh-like configuration of tubular netting. The jacket may be constructed as shown in FIG. 3 of a single layer of netting strands 25a–25c bonded together in zig-zag patterns along the length of the flexible outer hose wall 24 to structurally form a tubular configuration of netting for sliding over the flexible outer hose wall 24 of each array section 20. The jacket may also be constructed as shown in FIG. 4 of two layers of netting strands with the strands in each layer being spiraled, or wound helically, in opposite directions. For example, the top or overlying layer of netting strands 26a–26c are wound in a left-hand directional spiral, or helix, and the bottom or underlying layer of strands 27a–27c are wound in a right-hand directional spiral. The two layers are bonded together at the points where the individual strands are overlayed so as to structurally form a tubular configuration of netting for sliding over the flexible outer hose wall 24 of each array section 20.

Figure 5:
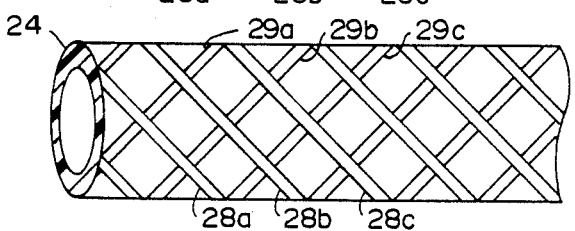
Figure 6:
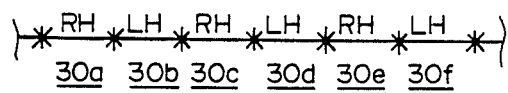
FIG. 6 is a diagrammatic representation of a marine acoustic array alternately employing the jackets of FIGS. 4 and 5 along its length.

However, a jacket having the left-hand spiralling of the overlying layer of netting strands as shown in FIG. 4 tends to impart a right-hand spiralling motion or rotation to the array section 20 as it is towed through a water layer. Consequently, to prevent a similar rotation of the entire array as it is towed through the water layer, adjacent sections 20 are surrounded by jackets that impart opposite forces of rotation to such adjacent sections. This is accomplished by alternating the sections 20 with the jacket of FIG. 4 and a jacket such as shown in FIG. 5 wherein the overlying layer of netting strands 28a-28c and the underlying layer of netting strands 29a-29c are helically wound or spiraled in the opposite directions from the corresponding layers of netting strands, shown in FIG. 4. In this manner, the opposite forces of rotation imparted to adjacent array sections by the jackets of FIGS. 4 and 5 are alternated along the entire length of the array so as to prevent array rotation during towing. This is illustrated in FIG. 6 which is a diagrammatic representation of alternative array sections 30a, 30c and 30e having right-hand (RH) rotational forces and alternating sections 30b, 30d and 30f having left-hand (LH) rotational forces.

While the tubular jackets of netting may have other mesh-like configurations than that shown in FIGS. 3-5, a jacket with diamond-like netting openings of FIGS. 3-5 can be readily slid over an array section 20 and stretched in the longitudinal direction to provide a snug fit to the flexible outer hose wall of the array section. The size of the diamond openings and strand size would be optimized for a particular array diameter and range of towing speeds. To keep the jacket from slipping as the array is towed through the water, it could be banded or otherwise secured in place at intervals along each array section.

Preferably strand thickness may be in the order of 50 thousandths of an inch.

Further, strand configuration could be oval, elliptical, rectangular or any other suitable shape and made of various materials such as a flexible plastic or natural fiber for example.

Figure 7:
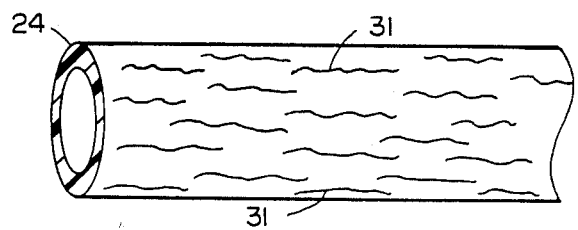
FIGS. 7–11 illustrate alternate embodiments to that illustrated in FIGS. 3–5 for the outer surface of a marine acoustic array.
Figure 8:
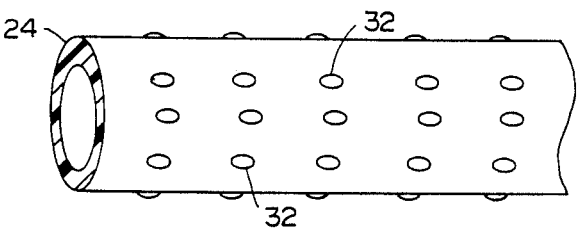
Figure 9:
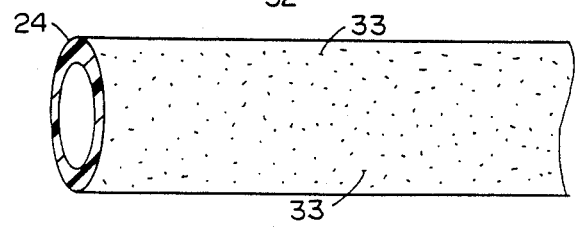

In an alternate embodiment to that shown in FIGS. 3-5, the plastic outer hose wall may be roughened by a suitable mechanical means as shown by the scratches or markings 31 shown in FIG. 7. In another embodiment a roughness may be imparted to the plastic outer hose wall by welding pellets of plastic to the outer surface of the plastic hose wall as shown at 32 in FIG. 8. In a yet further embodiment, particles of a coarse material may be affixed, or bonded, to the outer surface of the flexible outer hose wall as shown at 33 in FIG. 9.

Figure 10:
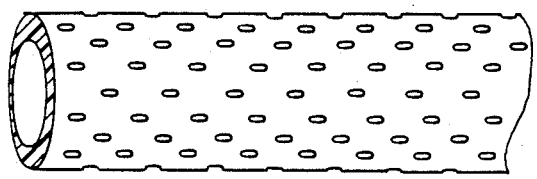

In a still further embodiment, a roughness may be imparted to the plastic outer hose by creating dimples or depressions or indentations to the outer surface of the plastic hose during the manufacturing of the hose, as shown in FIG. 10.

Figure 11:
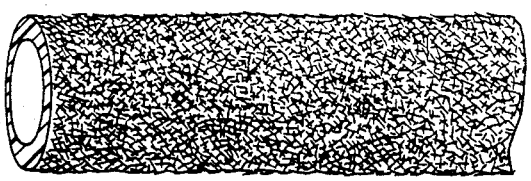

In yet another embodiment, a roughness may be imparted to the plastic outer hose by affixing or bonding a reticulated mesh to the outer surface of the plastic hose, the mesh having a total thickness of the order of 50 thousandths of an inch, as shown in FIG. 11.

The foregoing has described the marine acoustic array of the present invention. It is to be understood that various modifications to the disclosed embodiments, as well as alternate embodiments, may become apparent to one skilled in the art without departing from the scope and spirit of the invention as hereinafter defined by the appended claims.

We claim:

1. A marine acoustic array for towing through a water layer comprising a plurality of linear sections having acoustic sensors for the detection of acoustic reflection signals, each of said sections comprises a flexible outer hose wall with its outer surface molded in a non-smooth configuration to spread the turbulent boundary layer of water created adjacent the array as it is towed through the water layer outward from the array to reduce the intensity of the centered tow noise resulting from such turbulent boundary layer of water on the acoustic sensors and to eliminate rotational forces on each of said sections of the array as it is towed through the water layer.

2. A marine acoustic array for towing through a water layer comprising a plurality of linear sections having acoustic sensors for the detection of acoustic reflection signals, each of said sections comprises a flexible outer hose wall having coarse particles affixed to its outer surface to spread the turbulent boundary layer of water created adjacent the array as it is towed through the water layer outward from the array to reduce the intensity of the generated tow noise resulting from such turbulent boundary layer of water on the acoustic sensors and to eliminate rotational forces on each of said sections of the array as it is towed through the water layer.

3. A marine acoustic array for towing through a water layer comprising a plurality of linear sections having acoustic sensors for the detection of acoustic reflection signals, each of said sections comprises a flexible outer hose wall having a plurality of pellets affixed to its outer surface to spread the turbulent boundary layer of water created adjacent the array as it is towed through the water layer outward from the array to reduce the intensity of the generated tow noise resulting from such turbulent boundary layer of water on the acoustic sensors and to eliminate rotational forces on each of said sections of the array as it is towed through the water layer.

4. A marine acoustic array for towing through a water layer comprising a plurality of linear sections having acoustic sensors for the detection of acoustic reflection signals with adjacent sections of said array being surrounded by jackets of netting which spread the turbulent boundary layer of water created adjacent the array as it is towed through the water layer outward from the array to reduce the intensity of the generated tow noise resulting from the turbulent boundary layer of water on the acoustic sensors, wherein the jacket surrounding a first section of each adjacent pair of sections employs an underlying layer of netting strands spiraled in a first direction and an overlying layer of netting strands spiraled in a second direction said underlying and overlying layers of netting strands comprising the jacket surrounding said first section combining to provide a resulting rotational force in said second direction to said first section, and the jacket surrounding a second section of each adjacent pair of sections employs an underlying layer of netting strands spiraled in said second direction and an overlying layer of netting strands spiraled in said first direction, said underlying and overlying layers of netting strands comprising the jacket surrounding said second section combining to provide a resulting rotational force in said first direction to said second section, whereby the opposing rotational forces to each of said pair of sections provide for alternate forces of rotation along the length of the array to thereby prevent rotation of the array as it is towed through the water layer.

* * * * *